(12) United States Patent
Coates

(10) Patent No.: US 9,863,553 B2
(45) Date of Patent: Jan. 9, 2018

(54) COMBINATION LASER TARGET AND PLUG FOR SEWER PIPES

(71) Applicant: Wesley Arlen Coates, Grantsville, UT (US)

(72) Inventor: Wesley Arlen Coates, Grantsville, UT (US)

(*) Notice: Subject to any disclaimer, the term of this patent is extended or adjusted under 35 U.S.C. 154(b) by 105 days.

(21) Appl. No.: 15/176,838

(22) Filed: Jun. 8, 2016

(65) Prior Publication Data

US 2016/0356400 A1    Dec. 8, 2016

Related U.S. Application Data

(60) Provisional application No. 62/172,682, filed on Jun. 8, 2015.

(51) Int. Cl.

| | |
|---|---|
| *F16L 1/10* | (2006.01) |
| *G01C 15/00* | (2006.01) |
| *G01B 11/27* | (2006.01) |
| *G01C 15/06* | (2006.01) |
| *E03F 3/06* | (2006.01) |
| *E03F 7/00* | (2006.01) |
| *F16L 1/036* | (2006.01) |
| *F16L 55/24* | (2006.01) |
| *G01C 9/24* | (2006.01) |

(52) U.S. Cl.
CPC ............... *F16L 1/10* (2013.01); *E03F 3/06* (2013.01); *E03F 7/00* (2013.01); *F16L 1/036* (2013.01); *F16L 55/24* (2013.01); *G01B 11/27* (2013.01); *G01C 15/004* (2013.01); *G01C 15/06* (2013.01); *G01C 9/24* (2013.01)

(58) Field of Classification Search
CPC ......... F16L 1/10; G01C 15/00; G01C 15/004; G01C 15/006; G01B 11/26; G01B 11/27
USPC .......................................... 33/286, 293, 295
See application file for complete search history.

(56) References Cited

U.S. PATENT DOCUMENTS

| | | | |
|---|---|---|---|
| 3,116,557 A | 1/1964 | Trice, Jr. | |
| 3,279,070 A | 10/1966 | Blount | |
| 3,599,336 A * | 8/1971 | Walsh | G01C 15/002 248/168 |
| 3,631,601 A * | 1/1972 | McNulty | F16M 11/125 248/694 |
| 3,634,941 A * | 1/1972 | Roodvoets | G01C 15/02 33/1 H |
| 3,898,743 A * | 8/1975 | Myeress | G01C 15/06 33/293 |

(Continued)

*Primary Examiner* — Christopher Fulton
(74) *Attorney, Agent, or Firm* — Angus C. Fox, III

(57) ABSTRACT

A laser target assembly, which doubles as a pipe plug, has an outer sheath with a first end that fits within the end of a cut section of pipe, and a second, larger-diameter end that fits into the bell of an uncut section. A circular interior panel, made of tough plastic, is positioned in about the middle of the sheath perpendicular to its central axis. A lower half of the panel, which functions as the target, is opaque; the balance is transparent. A target scale, having evenly-spaced linear markings, is provided on the opaque portion of the panel. A bubble level, positioned within the larger-diameter end adjacent the panel, enables a pipe layer to position the target scale in a vertical orientation. Interior handles are used to adjust axial alignment of target assembly and remove the target assembly when it is installed within a bell.

11 Claims, 5 Drawing Sheets

(56) References Cited

U.S. PATENT DOCUMENTS

| | | | | |
|---|---|---|---|---|
| 4,392,744 A * | 7/1983 | Tatsuhama | ............ | G01B 11/26 |
| | | | | 299/1.3 |
| 5,052,807 A * | 10/1991 | Juday | .................... | G01B 11/27 |
| | | | | 356/399 |
| 5,054,730 A * | 10/1991 | Pensoneau | ................ | F16L 1/10 |
| | | | | 248/357 |
| 6,124,935 A * | 9/2000 | Matthews | ............ | G01C 15/008 |
| | | | | 33/286 |
| 7,042,555 B1 * | 5/2006 | Lawson | ............... | G01C 15/002 |
| | | | | 356/138 |
| 7,511,805 B2 * | 3/2009 | Hinderling | ............ | G01C 15/02 |
| | | | | 356/154 |
| 7,958,643 B1 * | 6/2011 | Wu | ....................... | G02B 23/14 |
| | | | | 33/297 |
| 9,074,871 B1 * | 7/2015 | Lubeck | ................ | G01B 11/026 |
| 9,080,864 B1 * | 7/2015 | McCarthy | ........... | G01C 15/004 |

\* cited by examiner

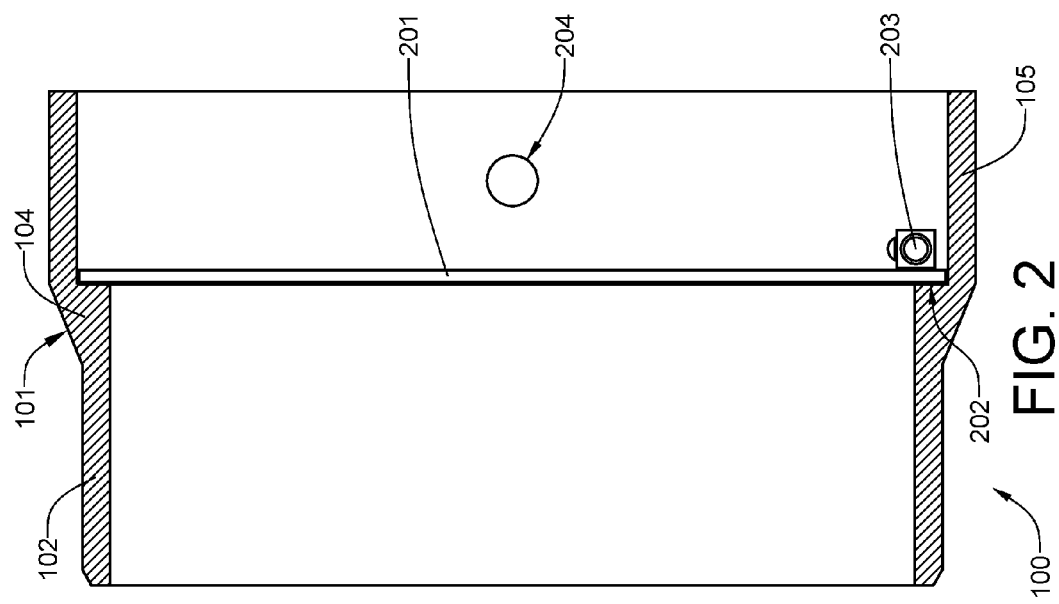
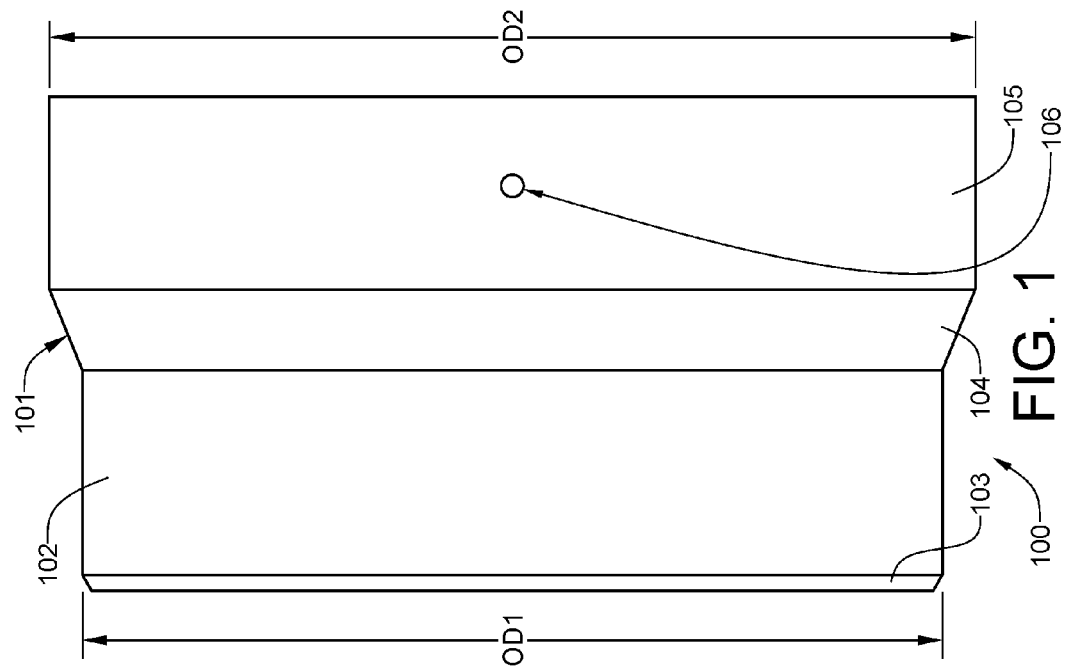

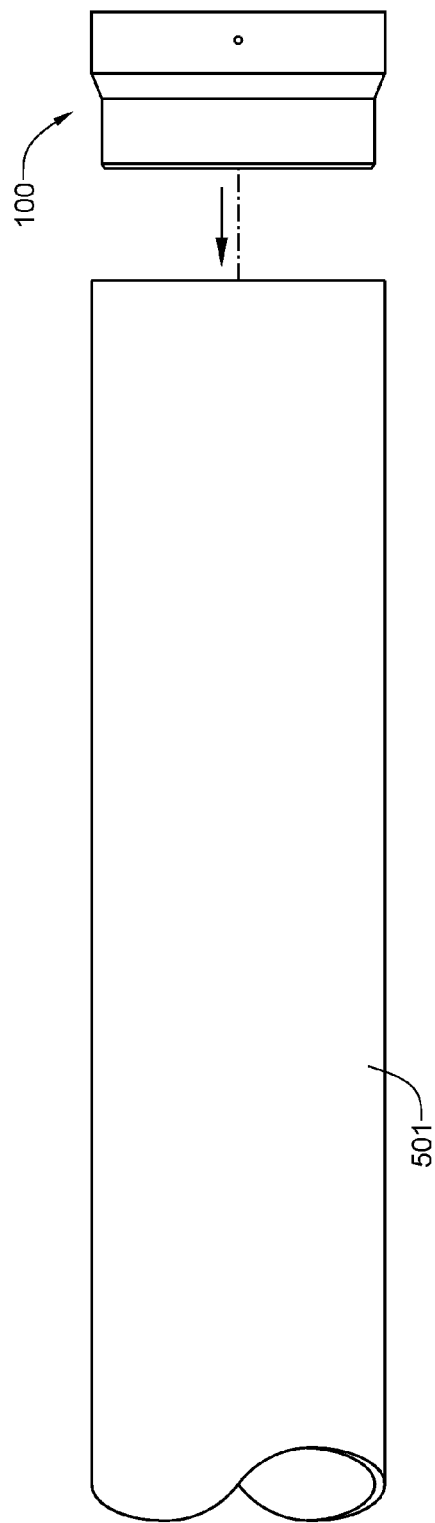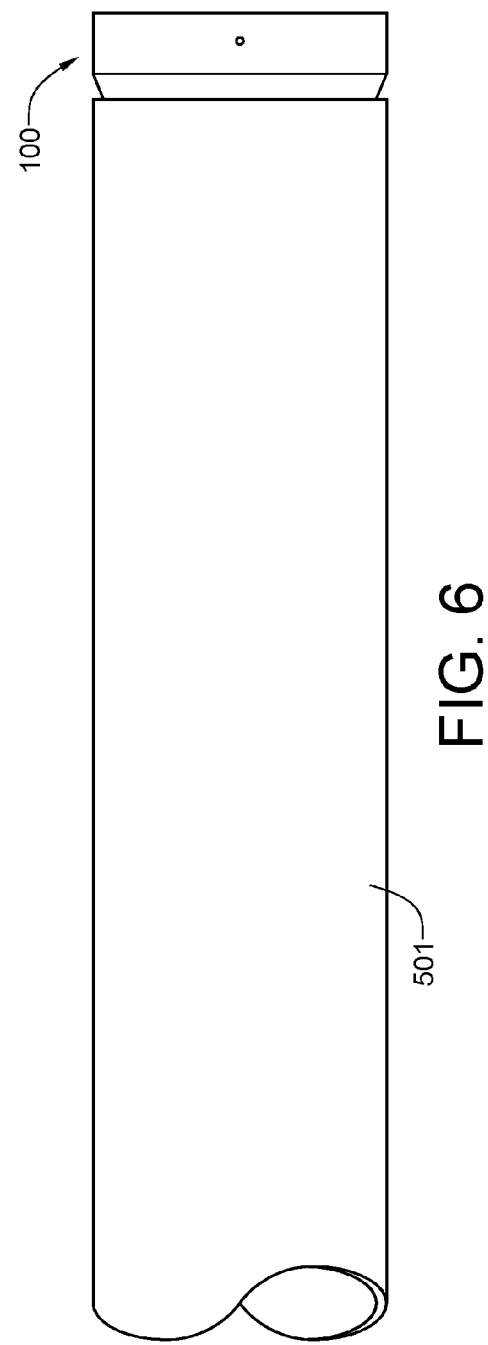

US 9,863,553 B2

COMBINATION LASER TARGET AND PLUG FOR SEWER PIPES

FIELD OF THE INVENTION

The present invention relates, generally, to laser alignment systems and, more specifically, to a method of laying sewer pipes, which must have a required minimum slope for proper drainage, by projecting a laser light beam along a desired course and attaching successive lengths of pipe so that the distal end of each newly-attached section is properly aligned with the laser beam. A primary aspect of the invention is the provision of a laser target, for such pipes, that can double as a pipe plug.

BACKGROUND OF THE INVENTION

In U.S. Pat. Nos. 3,116,557 and 3,279,070 there are disclosed methods for laying a pipeline with the use of a collimated light (laser) beam which is aligned along a preselected path for the pipeline. The last pipe in the line has a target coupled to the end. The pipe is moved until the target is aligned with the collimated beam and the pipe is then fixed in place. The pipeline is extended by inserting one end of another pipe into the end of the aligned pipe and aligning the other end with a target in the same manner as the previous pipe. The process is repeated until the pipeline has been extended the desired length.

As a general rule, a laser light source is positioned in a manhole and the beam is projected along the path of a pipeline. If the pipeline will carry fluids into the manhole, then the beam is elevated. Likewise, if the pipeline will carry fluids out of the manhole, then the beam is downwardly inclined. Targets are generally designed for use in pipe having a range of internal diameters. Thus, use of a target requires that it be precision adjusted so that the cross-hairs of that target will be aligned with the longitudinal axis of the pipe.

One problem associated with the laying of a pipeline is the entry into the pipeline of dirt, gravel and trash. Typically, this foreign material must be cleaned out of the pipeline before it can be put into use. This can be a costly and time-consuming process. Certainly, rather than cleaning the interior of an installed pipeline, it would be far better if the foreign material is prevented from entering the pipeline in the first place.

SUMMARY OF THE INVENTION

The present invention provides a laser target assembly having an outer sheath, a first end of which fits within the end of a cut section of pipe, and a second, larger-diameter end which fits into the bell of an uncut section. Targets are produced for each common size of pipe. A circular interior panel, made of a tough, thermoplastic polymer, such as polycarbonate, is positioned in about the middle of the sheath, and perpendicular to the central axis thereof. An upper half portion of the circular interior panel is preferably transparent to laser beams in the visible spectrum, while a lower half of the panel is opaque and functions as a target. A target scale, having evenly-spaced linear markings, is provided on the opaque portion of the panel. A bubble level, positioned within the larger-diameter end adjacent the panel, enables a pipe layer to position the target scale in a vertical orientation. Interior handles, attached on opposite sides of the larger-diameter end of the sheath, are used to adjust axial alignment of target assembly and remove the target assembly when it is installed within the bell of an uncut section of pipe being laid.

The laser target assembly can double as an easily-installable and easily-removable temporary pipe plug, which will prevent debris from entering into a newly-laid pipeline.

BRIEF DESCRIPTION OF THE DRAWINGS

A single embodiment of the laser target assembly will be shown and described. It should be understood that the drawings are not, necessarily, drawn to scale, and are intended to be merely illustrative of the invention.

FIG. 1 is a side elevational view of the laser target assembly;

FIG. 2 is a vertical cross-sectional view of the laser target assembly of FIG. 1, taken in a plane parallel to the page;

FIG. 5 is a side elevational view of a cut section of pipe and of the laser target assembly prior to installation of the target assembly into the cut end of the pipe;

FIG. 6 is a side elevational view of the cut section of pipe and of the laser target assembly of FIG. 5 following installation of the target assembly within the cut end of the pipe.

PREFERRED EMBODIMENT OF THE INVENTION

Figure 3:
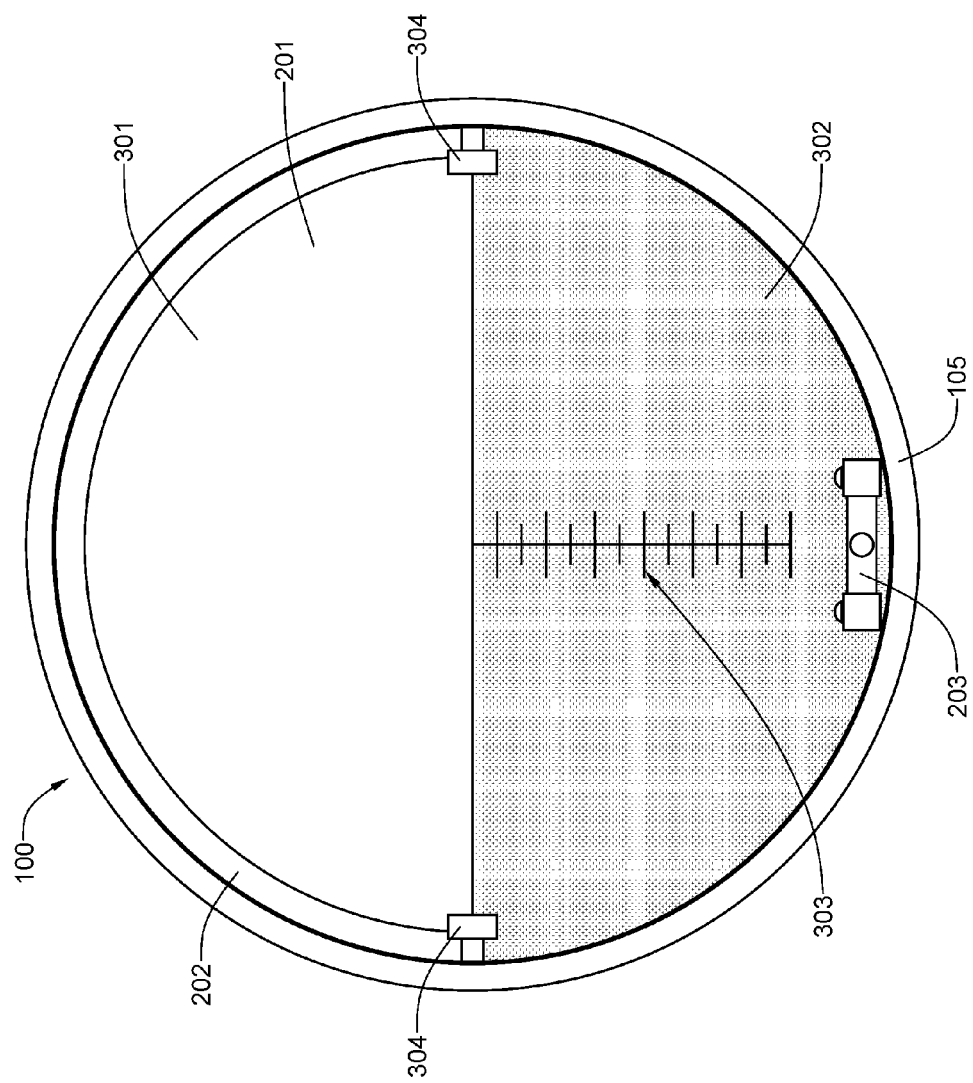
FIG. 3 is a rear elevational view of the laser target assembly of FIG. 1 from the larger-diameter end.

Referring now to FIG. 1, a laser target assembly 100 has a unitary outer sheath 101 with a first end portion 102 that fits within the end of a cut section of pipe, and a second, larger-diameter end portion 105 that fits into the bell of an uncut section of pipe. A transition portion 104 interconnects the first end portion 102 with the second end portion 105. The first end portion 102 has a chamfer 103 that facilitates the entry of the first end portion 102 into the cut end of a section of pipe. Interior handles that are installed in threaded apertures in the sheath 101, enable the target assembly 100 to be rotated and removed once it has been installed within the bell of an uncut section of pipe. The outside diameter OD1 of the first end portion 102 is slightly smaller than the inside diameter of the pipe for which this target assembly 100 is specifically designed so that the target assembly 100 can enter a cut section of pipe with a sliding, non-interference fit with little discernable clearance.

Referring now to the cross-sectional view of FIG. 2, a circular interior panel 201, made of a tough, thermoplastic polymer, such as polycarbonate, is positioned in about the middle of the sheath, and perpendicular to the central axis thereof. An interior annular shoulder 202 that is injection molded integral with the sheath 101, enables adhesive bonding of the panel 201 to the sheath 101. A bubble level 203, positioned at the bottom of the panel, enables a target scale printed or engraved on the panel 201 to be positioned vertically. One of the interior handles 204 can be seen in this view.

Referring now to FIG. 3, an upper half portion 301 of the circular interior panel 201 is preferably transparent to laser beams in the visible spectrum, while a lower half portion 302 of the panel is opaque and functions as a target. A target scale 303, having evenly-spaced linear markings, is provided on the lower half opaque portion 302 of the panel 201. For a preferred embodiment of the invention, the scale markings are white or black. Scale markings in either color can be easily seen with or without the laser beam impinging on the target. The lower half opaque portion 302 of the circular interior panel 201 must be either red or blue, depending on the color of laser being used. A red lower half opaque portion 302 will be used with red laser beams, while a blue lower half opaque portion 302 will be used with green laser beams. The colors are not interchangeable, as a red laser beam will not show up well on a blue target and a green laser beam will not show up well on a red target. A bubble level 203, positioned within the larger-diameter end adjacent the circular interior panel 201, enables a pipe layer to position the target scale 303 in a vertical orientation. Interior handles 304, attached on opposite sides of the larger-diameter end portion 105 of the sheath 101, are used to adjust axial alignment of target assembly 100 and remove the target assembly 100 when it is installed within the bell of an uncut section of pipe being laid. Targets are produced for each common size of pipe.

Figure 4:
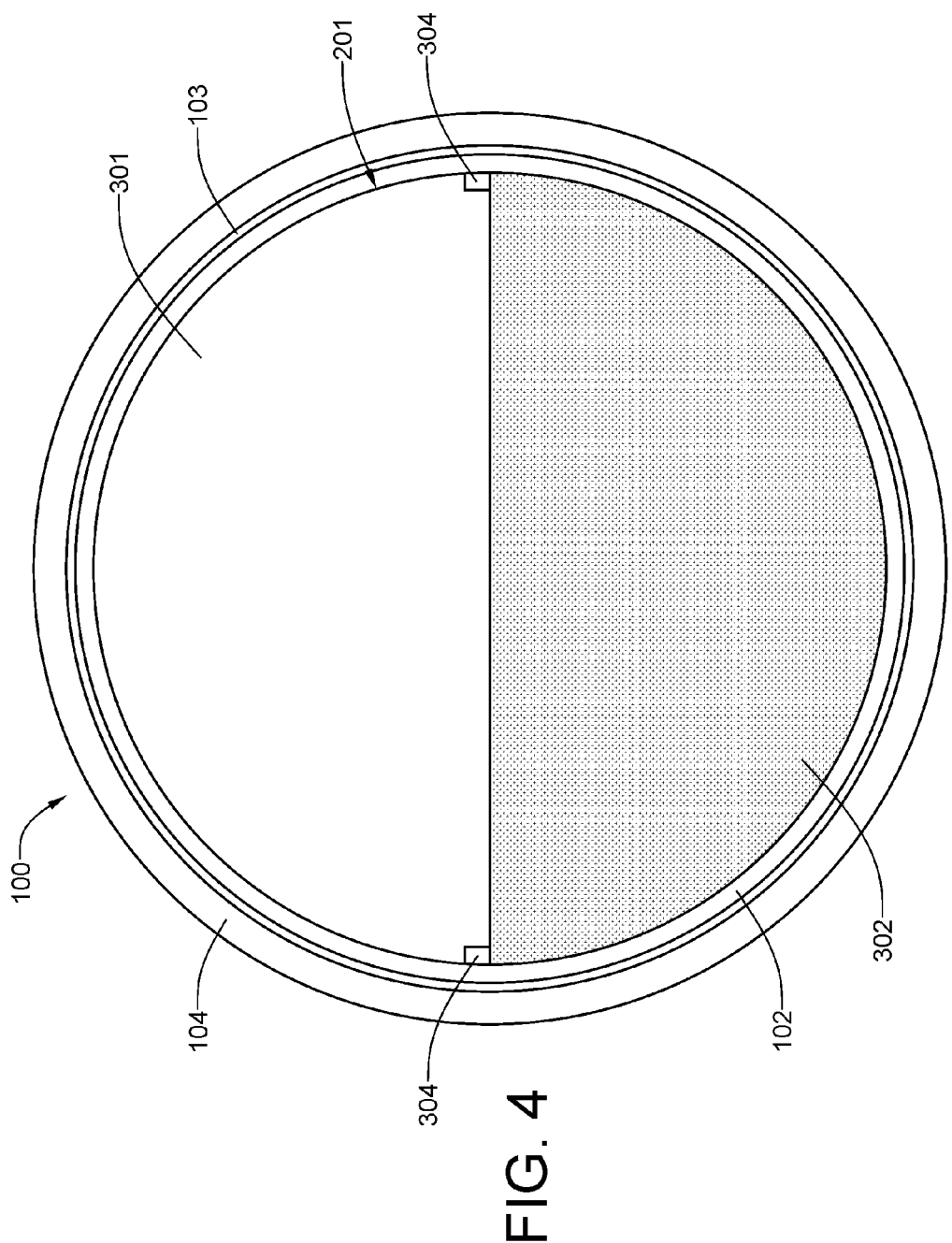
FIG. 4 is a front elevational view of the laser target assembly of FIG. 1 from the smaller-diameter end.

Referring now to FIG. 4, as seen from the smaller end, the front edge of the first end portion 102, the chamfer 103 on the first end portion 102, and the transition portion 104 are visible in this view, as are the circular interior panel 201, the transparent upper half portion 301 and the opaque lower half portion 302.

Referring now to FIG. 5, a cut section of pipe 501 (i.e., with no bell) and the laser target assembly 100 are shown prior to installation of the target assembly 100 into the cut end of the pipe 501.

Referring now to FIG. 6, the cut section of pipe 501 and of the laser target assembly 100 are shown following installation of the target assembly 100 within the cut end of the pipe 501. It will be noted that the transition portion 104 of the sheath 101 limits entry of the target assembly 100 into the cut end of the pipe 501, and that the second end portion 105 of the sheath 101 is fully outside the cut section of pipe 501.

Figure 7:
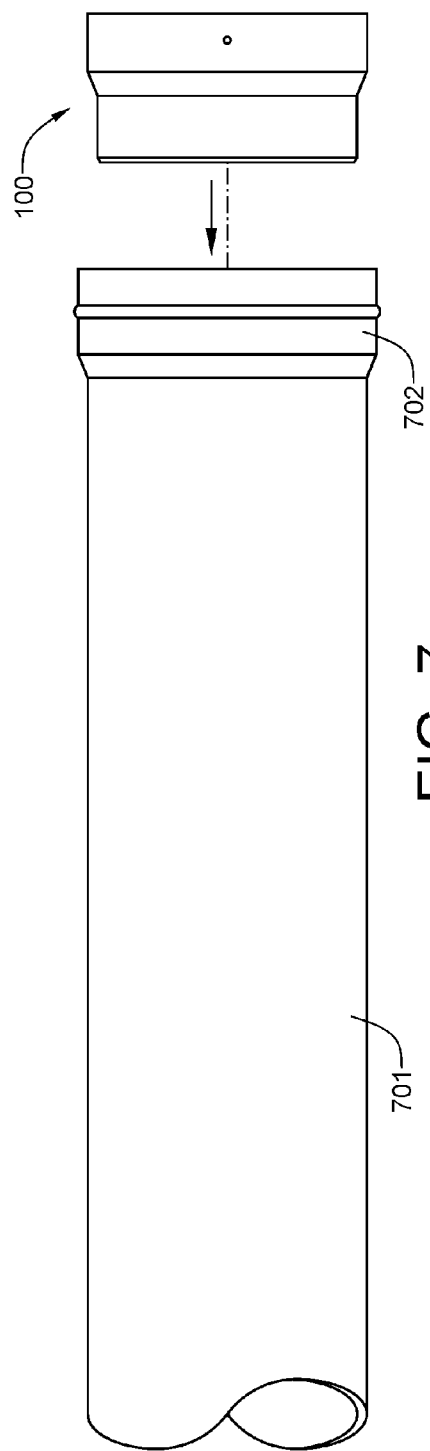
FIG. 7 is a side elevational view of an uncut section of pipe having an integral coupling bell and of the laser target assembly prior to installation of the target assembly into the coupling bell.

Referring now to FIG. 7, an uncut section of pipe 701, having an integral coupling bell 702, and the laser target assembly 100 are shown prior to installation of the target assembly 100 into the coupling bell 702.

Figure 8:
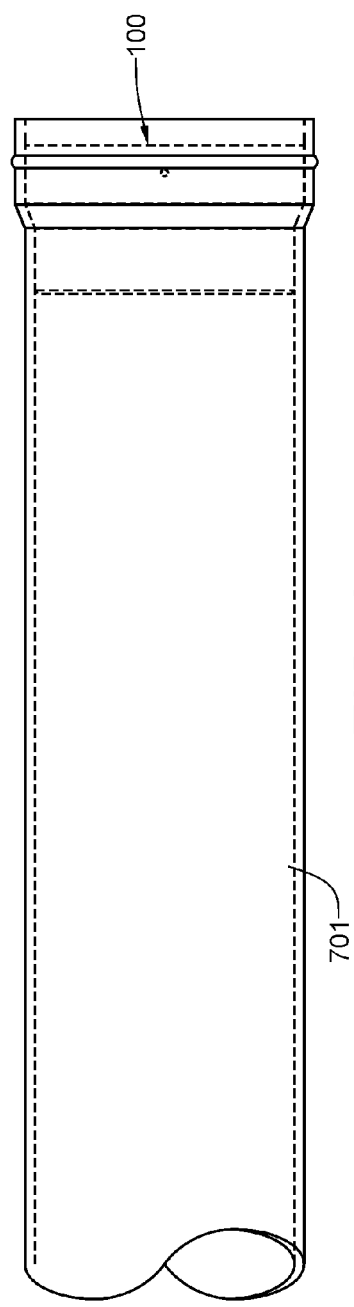
FIG. 8 is a side elevational view of the uncut section of pipe and of the laser target assembly of FIG. 7 following installation of the target assembly within the coupling bell.

Referring now to FIG. 8, the uncut section of pipe 701 and the laser target assembly 100 are shown following installation of the target assembly 100 within the coupling bell 702. It will be noted that the target assembly is fully within the pipe 701 and the coupling bell 702. The target assembly 100 is shown as a hidden feature with broken lines.

The laser target assembly 100 can double as an easily-installable and easily-removable temporary pipe plug for either cut or uncut section of pipe, which will prevent debris from entering into a newly-laid pipeline.

Although only a single embodiment of the new laser target assembly has been shown and described, it will be obvious to those having ordinary skill in the art that changes and modifications may be made thereto without departing from the scope and the spirit of the invention as hereinafter claimed.

What is claimed is:

1. A laser target assembly for temporary installation within a section of pipe which may have either an uncut end with a connector bell or a cut end without a connector bell, said laser target assembly comprising:
   an outer sheath having a central axis, a first end which fits within a cut end of the pipe which has no connector bell, and a second larger-diameter end, which fits into the bell of an uncut end; and
   a circular interior panel, made of a tough, thermoplastic polymer secured to the sheath and positioned in about the middle thereof perpendicular to the central axis, said circular interior panel having an upper half portion that is transparent to laser beams in the visible spectrum, and a lower half portion that is opaque and functions as a laser target.

2. The laser target assembly of claim 1, wherein said lower half opaque portion is equipped with evenly-spaced linear markings that function as a target scale.

3. The laser target assembly of claim 1, which further comprises a bubble level, positioned adjacent the circular interior panel within the larger-diameter end of the sheath, said bubble level enabling the target scale to be positioned in a vertical orientation.

4. The laser target assembly of claim 1, which further comprises a pair of interior handles, attached on opposite sides of the larger-diameter end of the sheath, which can be used to adjust axial alignment of target assembly and remove the target assembly when it is installed within the bell of an uncut end of a pipe section.

5. The laser target assembly of claim 1, wherein said assembly, in addition to being usable as a laser target, can double as easily-installable and easily-removable temporary pipe plug for a final section of pipe in a newly-laid pipeline having either an uncut end with a connector bell or a cut end without a connector bell, said assembly preventing the entry of debris into the newly-laid pipeline.

6. A laser target assembly for temporary installation within a section of pipe which may have either an uncut end with a connector bell or a cut end without a connector bell, said laser target assembly functioning as both a laser target and a temporary pipe plug, and comprising:
   an outer sheath having a central axis, a first end which fits within a cut end of the pipe which has no connector bell, and a second larger-diameter end, which fits into the bell of an uncut end; and
   a circular interior panel, made of a tough, thermoplastic polymer secured to the sheath and positioned in about the middle thereof perpendicular to the central axis, said circular interior panel having an upper half portion that is transparent to laser beams in the visible spectrum, and a lower half portion that is opaque and functions as a laser target.

7. The laser target assembly of claim 6, wherein said lower half opaque portion is equipped with evenly-spaced linear markings that function as a target scale.

8. The laser target assembly of claim 6, which further comprises a bubble level, positioned adjacent the circular interior panel within the larger-diameter end of the sheath, said bubble level enabling the target scale to be positioned in a vertical orientation.

9. The laser target assembly of claim 6, which further comprises a pair of interior handles, attached on opposite sides of the larger-diameter end of the sheath, which can be used to adjust axial alignment of target assembly and remove the target assembly when it is installed within the bell of an uncut end of a pipe section.

10. A laser target assembly for temporary installation within a section of pipe which may have either an uncut end with a connector bell or a cut end without a connector bell, said laser target assembly comprising:

an outer sheath having a central axis, a first end which fits within a cut end of the pipe which has no connector bell, and a second larger-diameter end, which fits into the bell of an uncut end; and a circular interior panel, made of a tough, thermoplastic polymer secured to the sheath and positioned in about the middle thereof perpendicular to the central axis, said circular interior panel having an upper half portion that is transparent to laser beams in the visible spectrum, and a lower half portion that is opaque, is equipped with evenly-spaced linear markings that function as a target scale;

a bubble level, positioned adjacent the circular interior panel within the larger-diameter end of the sheath, said bubble level enabling the target scale to be positioned in a vertical orientation; and a pair of interior handles, attached on opposite sides of the larger-diameter end of the sheath, which can be used to adjust axial alignment of target assembly and remove the target assembly when it is installed within the bell of an uncut end of a pipe section.

11. The laser target assembly of claim 10, wherein said assembly, in addition to being usable as a laser target, can double as easily-installable and easily-removable temporary pipe plug for a final section of pipe in a newly-laid pipeline having either an uncut end with a connector bell or a cut end without a connector bell, said assembly preventing the entry of debris into the newly-laid pipeline.

* * * * *